(12) United States Patent
Grimonprez et al.

(10) Patent No.: US 10,855,438 B2
(45) Date of Patent: Dec. 1, 2020

(54) METHODS AND DEVICES FOR TRANSMITTING A CONTINUOUS BIT STREAM IN A DIGITAL NETWORK NON-SYNCHRONOUS WITH THE BIT STREAM

(71) Applicant: THALES, Courbevoie (FR)

(72) Inventors: Benjamin Grimonprez, Cholet (FR); Michel Renaux, Gennevilliers (FR)

(73) Assignee: Thales, Courbevoie (FR)

( * ) Notice: Subject to any disclaimer, the term of this patent is extended or adjusted under 35 U.S.C. 154(b) by 40 days.

(21) Appl. No.: 16/005,538

(22) Filed: Jun. 11, 2018

(65) Prior Publication Data
US 2018/0294948 A1 Oct. 11, 2018

Related U.S. Application Data

(63) Continuation of application No. PCT/EP2016/080629, filed on Dec. 12, 2016.

(30) Foreign Application Priority Data

Dec. 11, 2015 (FR) ...................... 15 02574

(51) Int. Cl.
*H04L 7/04* (2006.01)
*H04J 3/16* (2006.01)
(Continued)

(52) U.S. Cl.
CPC ............... *H04L 7/04* (2013.01); *H04J 3/0602* (2013.01); *H04J 3/1623* (2013.01); *H04L 65/4069* (2013.01); *H04J 3/07* (2013.01)

(58) Field of Classification Search
CPC .......... H04L 7/04; H04L 65/4069; H04J 3/07; H04J 3/0602; H04J 3/1623
See application file for complete search history.

(56) References Cited

U.S. PATENT DOCUMENTS 4,489,421 A 12/1984 Burger
4,658,406 A * 4/1987 Pappas ................... H03K 23/68
377/114

(Continued)

FOREIGN PATENT DOCUMENTS

WO     WO 01/41338 A1    6/2001

OTHER PUBLICATIONS

International Search Report dated Mar. 15, 2017, received in PCT/EP2016/080629, filed Dec. 12, 2016.

(Continued)

*Primary Examiner* — Azizul Choudhury
(74) *Attorney, Agent, or Firm* — Knobbe, Martens, Olson & Bear, LLP

(57) ABSTRACT

Methods and devices for transmitting a continuous bit stream in a digital network non-synchronous with the bit stream are disclosed. In one aspect, the method includes digitizing a continuous bit stream implemented by a transmitting apparatus and restoring the continuous bit stream implemented by a receiving apparatus. A processor of the transmitting apparatus digitizes the initial continuous bit stream into a binary data sequence to be transmitted at a nominal frequency corresponding to a set clock period, the binary data to be transmitted being encapsulated in at least one transport frame sent to the receiving apparatus. The digitization includes estimating a mean emission clock period value of the data sequence, and inserting, in a predetermined field of the transport frame, information making it possible to restore, in the receiving apparatus, the mean emission clock period value of the data sequence.

11 Claims, 3 Drawing Sheets

(51) Int. Cl.
*H04J 3/06* (2006.01)
*H04L 29/06* (2006.01)
*H04J 3/07* (2006.01)

(56) References Cited

U.S. PATENT DOCUMENTS

| | | | | |
|---|---|---|---|---|
| 5,396,492 A * | 3/1995 | Lien | .................. | H04J 3/0632 |
| | | | | 375/E7.278 |
| 5,912,753 A * | 6/1999 | Cotter | .................. | H04B 10/299 |
| | | | | 359/108 |
| 6,157,604 A * | 12/2000 | Feyh | .................. | G11B 20/10037 |
| | | | | 369/124.01 |
| 7,649,910 B1 * | 1/2010 | Wechsler | .................. | H04J 3/0688 |
| | | | | 370/503 |
| 2013/0083809 A1 | 4/2013 | Renaux et al. | | |

OTHER PUBLICATIONS

Preliminary Search Report dated Jul. 15, 2016 received in FR 1502574 which corresponds to subject U.S. Appl. No. 16/005,538.

\* cited by examiner

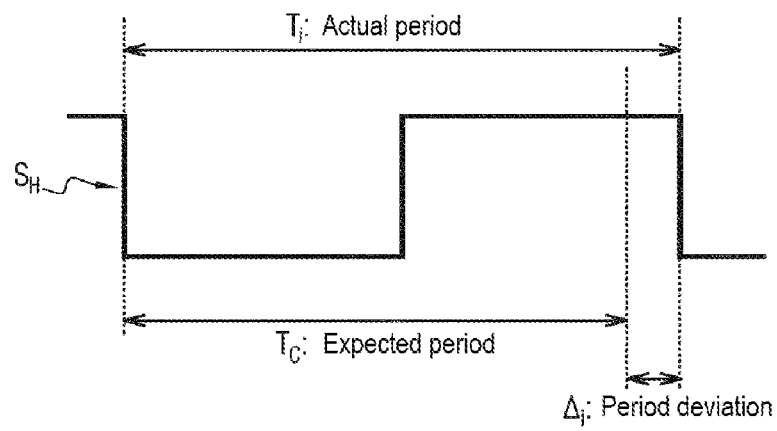
FIG.2
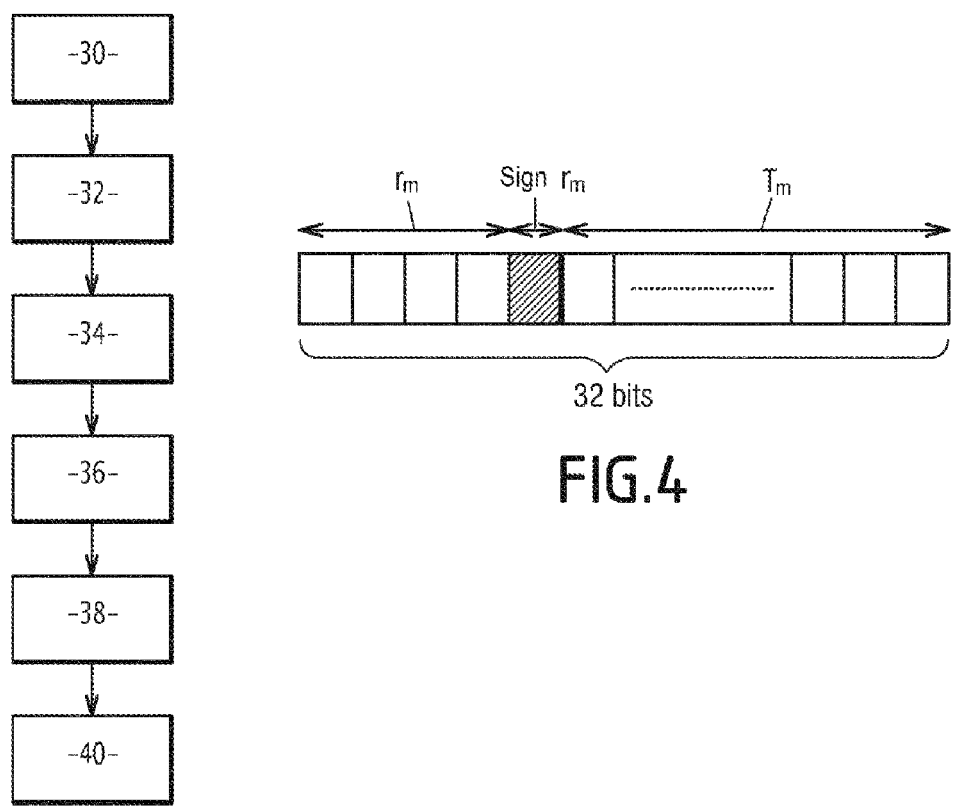
FIG.3
FIG.4

METHODS AND DEVICES FOR TRANSMITTING A CONTINUOUS BIT STREAM IN A DIGITAL NETWORK NON-SYNCHRONOUS WITH THE BIT STREAM

CROSS-REFERENCE TO RELATED APPLICATIONS

This application is a continuation of International Application No. PCT/EP2016/080629, filed Dec. 12, 2016, which claims the benefit under 35 U.S.C. § 119 of French Application No. 15 02574, filed Dec. 11, 2015, each of which is herein incorporated by reference in its entirety.

BACKGROUND

Technological Field

The described technology relates to a method for digitizing a continuous bit stream implemented by a transmitting apparatus and a method for restoring the continuous bit stream implemented by a receiving apparatus, being part of a continuous bit stream transmission, with no associated clock signal, via a digital network that is non-synchronous with the continuous bit stream.

The described technology is applicable for the transmission between a source and a recipient of a continuous bit stream.

Description of the Related Technology

The described technology falls within the field of the digital transmission in a clock domain, of continuous digital signals from another clock domain, the two clock domains not being frequency-slaved.

Furthermore, each of the clock domains has its own frequency stability according to the synchronization mode of each one.

Upon digitization of the bit stream, and more particularly in the digital measurement of the flow rate by the receiving equipment, an error is necessarily introduced due to the fact that the source is not frequency-slaved on the receiver. In a continuous transmission, this error necessarily generates an alteration in the transmission of the bit stream by the loss or the addition of one or several bits.

This digitization error is even more significant when the digitization clock of the receiver is of the plesiochronous type, and therefore has an allowance, also called jig, relative to a nominal frequency. Likewise, the source also has an intrinsic jig depending on the nature of this source. This is in particular the case when the source is an apparatus that uses a restored clock and not a local oscillator (for example, radio restoring the clock from its wireless reception).

To address this issue, it has been agreed to digitize the first bit stream of the first clock domain by a first over-sampling of the entering signal at a much higher frequency coming from the second clock domain. This solution increases the number of binary elements transmitted over the network and therefore consumes an excessive amount of this network's bandwidth.

In order to reduce the bandwidth, the digitization of a continuous bit stream consists of extracting the clock specific to the bit stream and sampling said bit stream in datagrams to be transmitted over the digital network.

In a synchronous network, the extraction of the clock specific to the bit stream is the measurement of the received signal phase offset relative to a stable clock of the clock domain of the network. The phase measurement being done at a high frequency, it is thus possible to have a precise phase measurement. This measurement is sent with the data. It is then possible to restore the data at the rhythm of a clock that takes the phase measurement into account. This solution is not compatible with a plesiochronous network, since the stability of the phase of the clock of the network in several locations of the network is not guaranteed.

The described technology aims to avoid the loss of binary data between a bit stream emitted by a source and the bit stream restored for a recipient.

SUMMARY OF CERTAIN INVENTIVE ASPECTS

To that end, the described technology proposes a method for digitizing a continuous bit stream, with no associated clock signal, in a nonsynchronous communication system of said bit stream, for a transmission between a first transmitting apparatus and a second receiving apparatus, the initial continuous bit stream being digitized by the first transmitting apparatus by using an emission clock signal into a binary data sequence to be transmitted at a nominal frequency corresponding to a set clock period, the binary data to be transmitted being encapsulated in at least one transport frame, said frame being sent to the second apparatus, the method, implemented by a processor of the first transmitting apparatus. The method includes the following steps:

estimating a mean emission clock period value of the data sequence, inserting, in a predetermined field of the transport frame, information making it possible to restore, in the second apparatus, said mean emission clock period value of the data sequence.

Advantageously, the insertion in a transport frame of information making it possible to calculate, in the second apparatus, the mean emission clock period value of the data sequence makes it possible to restore the initial bit stream at the actual emission frequency in the second apparatus, and consequently to avoid the drift and the data loss.

The described technology thus makes it possible to restore a synchronous bit stream without transmitting a clock signal associated with the bit stream.

The bit stream digitization method according to the described technology also includes one or more of the features below, considered independently or according to all technically possible combinations thereof.

The emission clock signal is defined by emission clock cycles, and the estimating step includes estimating the duration of each emission clock cycle of the binary data sequence to be transmitted and calculating the deviation between the set clock period and said calculated duration for each emission clock cycle.

The method includes calculating a mean value of said deviations and estimating the mean emission clock period value based on the set clock period and said mean value of the deviations.

The calculation of the mean value of the deviations is carried out by an Euclidian division of the sum of said deviations by the number of binary data of said binary data sequence to be transmitted, providing a remainder value of the division and a sign of said remainder.

Additional information including said remainder value of the division and the sign of said remainder is inserted into said transport frame.

According to another aspect, the described technology relates to a transmitting apparatus of a communication system adapted for carrying out a continuous bit stream digitization method as briefly described above.

According to another aspect, the described technology relates to a method for restoring a continuous bit stream, transmitted with no associated clock signal, in a communication system that is nonsynchronous of said bit stream, between a first transmitting apparatus and a second receiving apparatus, the initial continuous bit stream being digitized by a digitization method as briefly described above implemented in the first transmitting apparatus, the restoring method being implemented by a processor of the second receiving apparatus. This method includes the following steps:

extracting, from a predetermined field of the transport frame, information making it possible to restore the mean emission clock period value of the data sequence;

generating a restore clock signal, each cycle of which has a duration equal to said mean emission clock period value;

restoring a bit stream with a pace given by said restore clock signal.

The bit stream restoring method according to the described technology also includes one or more of the features below, considered independently or according to all technically possible combinations thereof.

It further includes extracting, from said transport frame, additional information making it possible to obtain a restored bit stream with the same total duration as the bit stream transmitted by the first transmitting apparatus.

The additional information includes an Euclidian division remainder value of a sum of the deviations between the set clock period and a duration calculated for each emission clock cycle by the number of binary data of said binary data sequence to be transmitted, and a sign of said remainder.

The method includes an adjustment of at least one restore clock cycle duration of said second receiving apparatus based on the value of said remainder and the sign of said remainder.

According to another aspect, the described technology relates to a receiving apparatus of a communication system adapted for carrying out a continuous bit stream restoring method as briefly described above.

BRIEF DESCRIPTION OF THE DRAWINGS

Other features and advantages of the described technology will emerge from the description thereof provided below, for information and non-limitingly, in reference to the appended figures, in which:

FIG. 2 schematically illustrates a clock period deviation;

FIG. 3 is a block diagram of the main steps of a transmission method according to one embodiment carried out in an transmitting apparatus;

FIG. 4 schematically illustrates a user field of a communication frame;

DETAILED DESCRIPTION OF CERTAIN INVENTIVE EMBODIMENTS

Figure 1:
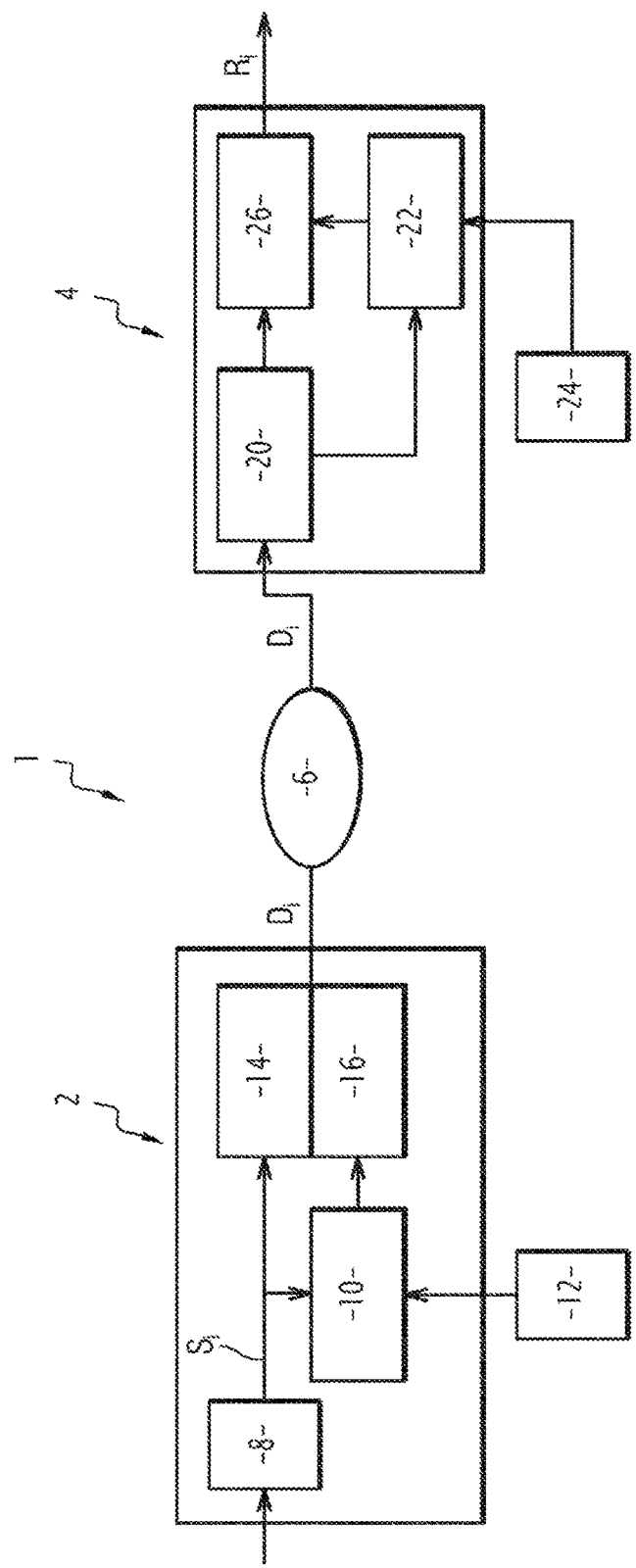
FIG. 1 shows a communication system between a transmitting apparatus and a receiving apparatus according to one embodiment.

FIG. 1 shows a communication system in which the described technology is applicable.

The system 1 of FIG. 1 schematically illustrates the communication between a first transmitting apparatus 2 and a second receiving apparatus 4, via a plesiochronous communication network 6.

It is understood that the described technology is not limited to communication between two apparatuses, and more generally applies in a network in which multiple apparatuses are connected, and makes it possible to ensure the precise restoration of a remote clock period on any number of receiving apparatuses.

Furthermore, the described technology is also not limited to an application in a plesiochronous network.

The plesiochronous network 6 is for example a packet-switched network of the Ethernet type, according to the PTP Ethernet communication protocol—IEEE 1588.

The transmitting apparatus 2 comprises a digitization module 8, able to generate an initial bit stream $S_i$, with a nominal frequency $F_c$ (or set frequency) corresponding to a set clock period $T_c$, the period being the duration of a cycle of the clock signal.

The bit stream is formatted in sequences of binary data or datagrams, encapsulated in transport frames, by the formatting module 14. These are the frames Di that are transmitted over the network.

Each frame comprises a data sequence to be transmitted (also called user data, corresponding to the bit stream to be transmitted), as well as signaling fields. The formatting of a frame is defined by the communication protocol.

A data sequence to be transmitted comprises n binary samples (or bits). The sequence is paced by the emission clock signal, comprising n clock cycles, the clock period being the mean duration of the clock cycle, which is the duration between two rising edges of the clock signal.

In theory, the clock period is constant and equal to a set clock period $T_c$, therefore the clock period is equal to the mean period for each clock cycle.

In practice, very small deviations are observed, which are variable over time, between the expected clock period (set clock period) and the actual emission clock period, or real period, as illustrated schematically in FIG. 2.

FIG. 2 shows the set clock period $T_c$, which is the expected period, the actual clock period $T_i$ for a clock cycle, and the deviation $\Delta_i$.

The actual emission clock signal $S_H$ is illustrated in solid lines in FIG. 2.

The actual emission clock period associated with the initial bit stream $S_i$ is measured by a clock measuring module 10, using a reference clock 12 with a frequency greatly exceeding the emission clock frequency, as explained in more detail below.

For example, the clock frequency of the reference clock is 100 Megahertz (MHz), while the nominal frequency is about 32 kilohertz (kHz).

In one embodiment, the reference clock 12 is inside the transmitting apparatus 2.

In one alternative, the reference clock 12 is outside the transmitting apparatus 2.

The clock measuring module 10 makes it possible to measure the deviation, in mean value, between the set clock period $T_c$ and the mean value of the emission clock period, denoted $T_m$, and simply called mean emission period hereinafter.

Information representative of the mean emission period of a data sequence of a bit stream is inserted into a reserved data field of a frame encapsulating these data of the bit stream.

Additional information making it possible to restore a bit stream $R_i$ with the same total duration is added, as explained in more detail hereinafter.

The second receiving apparatus 4 receives the frame Di, and the binary data of the sequence are stored temporarily in a buffer memory 20.

The receiving apparatus 4 includes a module 22 for generating a restore clock that carries out the extraction of the mean value information of the emission clock period and additional information from the dedicated field of the received frame.

This information is used to generate a restore clock frequency having an associated restore clock period, equal on average at the mean value of the emission clock period, using a counter paced on a reference clock 24.

The reference clock 24 has the same reference frequency as the reference clock 12 associated with the transmitting equipment, for example 100 MHz.

In one embodiment, the reference clock 24 is inside the receiving apparatus 4.

In one alternative, the reference clock 24 is outside the receiving apparatus 4.

In one embodiment, a single outside reference clock replaces both reference clocks 12, 24.

The bit stream $R_i$ is restored, at the restore clock frequency, by the sampling module 26 of the receiving apparatus 4.

FIG. 3 is a block diagram of the main steps carried out in the transmitting apparatus in one embodiment.

The steps of the method are carried out by a programmable device integrated into the transmitting apparatus, comprising a computing processor, for example a programmable logic circuit of the FPGA type.

During a first step 30, the number of reference clock strikes between successive rising edges of the clock signal of the bit stream Si to be processed is calculated.

The clock period $T_k$ of each sample k of the sequence is obtained.

The set clock period $T_c$ being known and stored, during step 32 one obtains the deviation $\Delta_k = T_k - T_c$. The value of the deviation can be positive or negative.

The obtained deviation values are accumulated and summed in step 34:

$$S_k = \sum_{j=1}^{k} \Delta_j$$

Once the deviation values between set clock period and actual clock period are obtained for the n considered cycles, an Euclidian division is carried out in step 36 to obtain the mean value of the deviations. The number n is the number of cycles in a datagram, therefore the number of bits in a datagram.

$$\Delta_m = S_n / n$$

The Euclidian division operation also provides a remainder $r_m$, which can be either nil, or a positive or negative integer value, defined by the formula:

$$S_n = n \times \Delta_m + r_m$$

Advantageously, the use of the sum of the deviations and the application of the division to the sum of the deviations makes it possible to save computing resources in the calculation of the division.

For example, when the nominal frequency is 32 kHz, an allowance is considered of +/−10% relative to the nominal frequency, for a sequence size n=128 bits, the calculation of the mean of the clock periods would require enumerator of 19 bits, while the calculation of the mean of the deviations requires a numerator of 15 bits.

The mean clock period is next obtained in step 38 by the calculation, by adding the obtained mean value of the deviations, which can be positive or negative, to the set period:

$$T_m = T_c + \Delta_k$$

Indeed, for each clock cycle corresponding to a sample k, we have, as explained above: $T_k = T_c + \Delta_k$ The mean period is given by:

$$T_m = \frac{1}{n}\sum_{k=1}^{n} T_k = \frac{1}{n}\left(n \times T_c + \sum_{k=1}^{n} \Delta_k\right) = T_c + \Delta_m$$

A first piece of information making it possible to obtain the mean clock period is the calculated value $T_m$.

During step 40 for formatting the transmission data, this first piece of information is inserted into an appropriate field of the frame to be transmitted.

This first piece of information will make it possible to restore the mean clock frequency and the mean value of the emission clock period at the receiving apparatus.

An additional piece of information made up of the remainder $r_m$ and the sign of the remainder $r_m$ is also inserted into the frame to be transmitted.

Advantageously, the transmission of this additional information, in addition to the information making it possible to obtain the mean clock period, will make it possible to restore, in the receiving apparatus, a clock signal having exactly the same duration, for the number n of cycles, as the emission clock signal, without transmitting a clock signal associated with the bit stream $S_i$.

For example, a 32-bit user field of the Ethernet frame is used to transmit information $T_m$, $r_m$ and the sign of $r_m$.

In one example embodiment, the user field includes 32 bits, and the 11 most significant bits (MSB) are used for the remainder $r_m$ encoded on 10 bits and its sign encoded on 1 bit, the other 21 bits being used for the mean value of the calculated emission clock period $T_m$, as illustrated schematically in FIG. 4.

Advantageously, the transmission of the mean value of the emission clock period $T_m$ is usable by any receiver.

Alternatively, in one scenario where the or each receiver knows the set period Tc, the obtained mean value of the deviations $\Delta_m$ is transmitted, with its sign.

Figure 5:
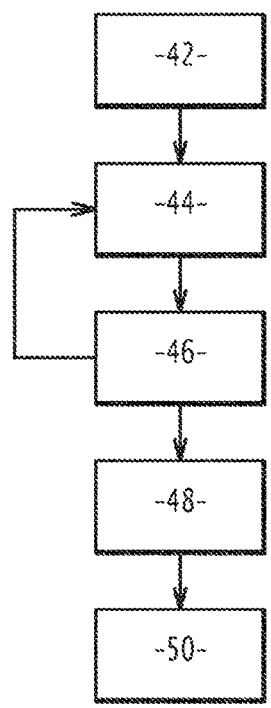
FIG. 5 is a block diagram of the main steps of a restoring method according to one embodiment carried out in an receiving apparatus.

FIG. 5 is a block diagram of the main steps carried out in the receiving apparatus in one embodiment.

The steps of the method are carried out by a programmable device integrated into the receiving apparatus, comprising a computing processor, for example a programmable logic circuit of the FPGA type.

During a step 42, the mean clock period information $T_m$, as well as the additional information containing the remainder $r_m$ of the division and its sign, are extracted from the user field of the received frame and stored.

During step 44, a clock cycle with clock period equal to $T_m$ is generated for the current sample.

During step 46, it is verified whether the absolute value $r'_m$ of the stored remainder is greater than 0.

If it is, step 46 is followed by a step 48 for adjusting the duration of the current cycle of a reference clock strike, in addition or less depending on whether the sign of the remainder is positive or negative, relative to the mean clock period.

Step 48 is followed by a step 50 for decrementation by 1 of the absolute value of the stored remainder $r'_m$.

When the absolute value of the stored remainder is nil ($r'_m=0$), then step 46 is followed by step 44 previously described.

Thus, for a current clock cycle, the restored clock period is either equal to the mean clock period $T_m$, or equal to $T_m-1$ or $T_m+1$, in other words shorter or longer than a reference clock strike, based on the sign of the remainder $r_m$.

The bit stream $R_i$ is restored according to the paces of the restored cycles during steps 44 or 48 described above.

It should be noted that with the restoring method described above, even if the variation of the emission clock is not faithfully reproduced by the receiving equipment upon each clock cycle, the mean value of the emission period is respected, as well as the total duration of the sample sequence of the initial bit stream.

Figure 6:
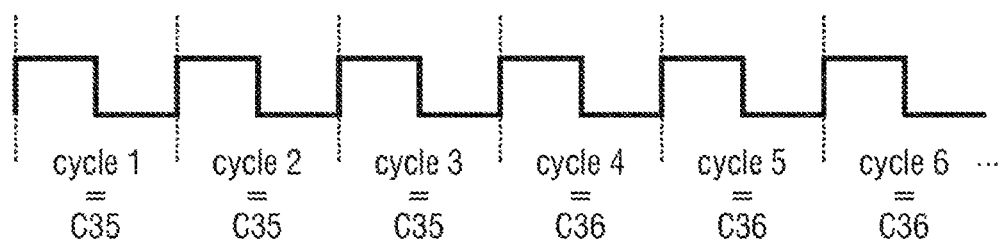
FIG. 6 schematically illustrates a sequence of restored clock cycles according to one embodiment.

For example, if a sequence of n=128 cycles is considered, with a mean emission clock period equal to $T_m$=C36 in hexadecimal (or 3126 in decimal), the value of the period indicating the number of reference clock strikes (at reference frequency 100 MHz) of an emission clock cycle, and a negative remainder of $r_m=-4$, one obtains cycles as illustrated schematically in FIG. 6: the first four cycles have a period value equal to C35, i.e., decreased by a reference clock cycle relative to the mean clock period $T_m$, and the following clock cycles have a period $T_m$ equal to the mean period.

Thus, the total duration of the restored sequence is equal to the total duration of the sequence initially emitted, and the emitted and restored sequences have the same mean frequency.

The implementation of the inventive method described above has the advantage of simplicity.

Alternatively, the period value of other cycles is adjusted, for example the last cycles or then one cycle out of P, with a given frequency P, for example one cycle out of 2, one cycle out of 3.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for digitizing a continuous bit stream, with no associated clock signal, in communication system that is nonsynchronous with the bit stream, for a transmission between a first transmitting apparatus and a second receiving apparatus, the initial continuous bit stream being digitized by the first transmitting apparatus by using an emission clock signal into a binary data sequence to be transmitted at a nominal frequency corresponding to a set clock period, the binary data to be transmitted being encapsulated in at least one transport frame, the frame being sent to the second receiving apparatus, the method, implemented by a processor of the first transmitting apparatus, comprising:

estimating a mean emission clock period value of the data sequence; and inserting, in a predetermined field of the transport frame, information making it possible to restore, in the second receiving apparatus, the mean emission clock period value of the data sequence.

2. The digitization method according to claim 1, wherein the emission clock signal is defined by emission clock cycles, wherein the estimating comprises estimating the duration of each emission clock cycle of the binary data sequence to be transmitted and calculating a deviation between the set clock period and the duration estimated for each emission clock cycle.

3. The digitization method according to claim 2, further comprising:

calculating a mean value of the deviations; and estimating the mean emission clock period value based on the set clock period and the mean value of the deviations.

4. The digitization method according to claim 3, wherein the calculation of the mean value of the deviations is carried out by a Euclidian division of the sum of the deviations by the number of binary data of the binary data sequence to be transmitted, providing a remainder value of the division and a sign of the remainder.

5. The digitization method according to claim 4, wherein additional information including the remainder value of the division and the sign of the remainder is inserted into the transport frame.

6. A transmitting apparatus of a communication system, adapted to carry out a continuous bit stream digitization method according to claim 1.

7. A method for restoring a continuous bit stream, transmitted with no associated clock signal, in a communication system that is nonsynchronous with the bit stream, between a first transmitting apparatus and a second receiving apparatus, the initial continuous bit stream being digitized by a digitization method according to claim 1 implemented in the first transmitting apparatus, the restoring method, implemented by a processor of the second receiving apparatus, comprising:

extracting, from a predetermined field of the transport frame, information making it possible to restore the mean emission clock period value of the data sequence;

generating a restore clock signal, each cycle of which has a duration equal to the mean emission clock period value; and restoring a bit stream with a pace given by the restore clock signal.

8. The restoring method according to claim 7, further comprising:

extracting, from the transport frame, additional information making it possible to obtain a restored bit stream with the same total duration as the bit stream transmitted by the first transmitting apparatus.

9. The restoring method according to claim 8, wherein the additional information includes a Euclidian division remainder value of a sum of the deviations between the set clock period and a duration calculated for each emission clock cycle by the number of binary data of the binary data sequence to be transmitted, and a sign of the remainder.

10. The restoring method according to claim 9, further comprising an adjustment of at least one restore clock cycle duration of the second receiving apparatus based on the value of the remainder and the sign of the remainder.

11. A receiving apparatus of a communication system, adapted to carry out a continuous bit stream restoring method according to claim 7.

\* \* \* \* \*